United States Patent
Yeh

(10) Patent No.: US 8,899,787 B2
(45) Date of Patent: Dec. 2, 2014

(54) THERMAL PROTECTION STRUCTURE FOR MULTI-JUNCTION LED MODULE

(75) Inventor: Wei-Yu Yeh, Tainan (TW)

(73) Assignee: TSMC Solid State Lighting Ltd., Hsin-Chu (TW)

( * ) Notice: Subject to any disclaimer, the term of this patent is extended or adjusted under 35 U.S.C. 154(b) by 445 days.

(21) Appl. No.: 13/287,171

(22) Filed: Nov. 2, 2011

(65) Prior Publication Data

US 2013/0106297 A1    May 2, 2013

(51) Int. Cl.
*F21V 27/00* (2006.01)
*H05B 33/08* (2006.01)

(52) U.S. Cl.
CPC .............. *H05B 33/089* (2013.01); *Y02B 20/341* (2013.01)
USPC .................................. 362/249.01; 362/249.11

(58) Field of Classification Search
USPC ......... 315/122, 244, 291, 307, 312, 294, 297; 362/84, 249.01, 249.02, 249.03, 362/249.11
See application file for complete search history.

(56) References Cited

U.S. PATENT DOCUMENTS

| | | | |
|---|---|---|---|
| 2010/0102228 A1* | 4/2010 | Chen et al. ..................... | 250/330 |
| 2011/0169407 A1* | 7/2011 | Hasnain .......................... | 315/32 |
| 2011/0221330 A1* | 9/2011 | Negley et al. ................. | 313/501 |
| 2011/0222264 A1* | 9/2011 | Matsuda et al. ................ | 362/84 |

* cited by examiner

*Primary Examiner* — Minh D A
(74) *Attorney, Agent, or Firm* — Haynes and Boone, LLP

(57) ABSTRACT

The present disclosure discloses an apparatus for thermally protecting an LED device. The apparatus includes a substrate. The apparatus includes a plurality of light-emitting devices disposed over the substrate. A selected one of the plurality of light-emitting devices is at least partially surrounded by the rest of the plurality of light-emitting devices. The apparatus includes a feedback mechanism electrically coupled to the selected light-emitting device. The feedback mechanism is operable to detect a change in a temperature of the selected light-emitting device. The feedback mechanism is also operable to adjust an electrical current through at least the selected light-emitting device in response to the detected change in the temperature.

20 Claims, 8 Drawing Sheets

US 8,899,787 B2

THERMAL PROTECTION STRUCTURE FOR MULTI-JUNCTION LED MODULE

TECHNICAL FIELD

The present disclosure relates generally to light-emitting devices, and more particularly, to thermal protection of light-emitting diode (LED) devices.

BACKGROUND

LED devices have experienced rapid growth. An LED device, as used herein, is a semiconductor light source for generating a light at a specified wavelength or a range of wavelengths. An LED device emits light when a voltage is applied across a p-n junction formed by oppositely doped semiconductor compound layers. Different wavelengths of light can be generated using different materials by varying the bandgaps of the semiconductor layers and by fabricating an active layer within the p-n junction.

LED devices are traditionally used for indicator lamps, and are increasingly used for displays and general lighting. As a new generation light source, LED devices are capable of replacing incandescent lamps, fluorescent lamps and high-intensity discharge lamps. When compared to incandescence light sources, LED devices offer advantages such as reduced power consumption, longer lifetime, faster response speed, more compact size, lower maintenance costs, and greater reliability. LED devices have thus found many applications, including backlighting for displays, automotive lighting, general lighting, and flash for mobile cameras.

Thermal management for LED devices, especially for high bright LED devices (HBLEDs) is important to these LED devices' performance and lifetime. Thermal management may be implemented by techniques of enhancing heat dissipation and reducing heat production. To enhance heat dissipation, developments have been made in areas such as heat sink, printed circuit board (PCB) as well as LED packaging. Thermal protection structures are also used to prevent overheating of LED device during their operation. However, traditional LED thermal protection structures may not function well when a plurality of LED devices are used in a lighting module. Therefore, while existing LED thermal protection structures have been generally adequate for their intended purposes, they have not been entirely satisfactory in every aspect. Methods and designs that improve the temperature detection accuracy and prevent overheating situations in a plurality of LED devices continue to be sought.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

SUMMARY

Figure 1:
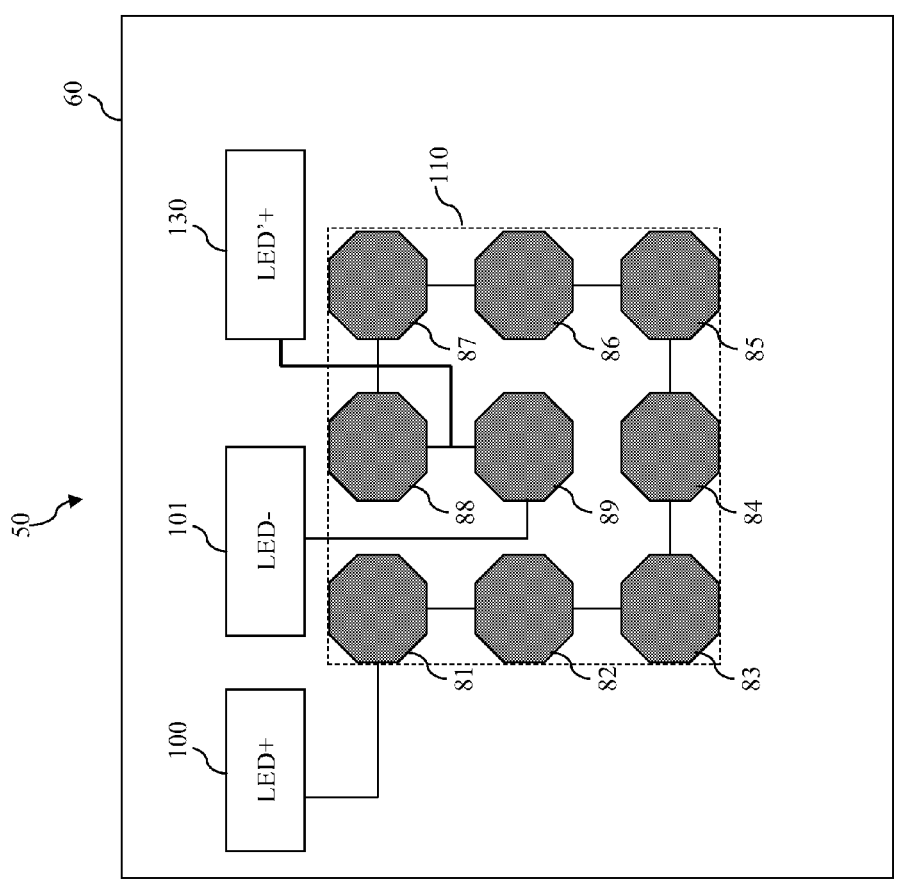
FIG. 1 is a simplified diagrammatic top view of a light module containing a group of LED devices according to various aspects of the present disclosure.

One of the broader forms of the present disclosure involves an LED thermal protection apparatus. The apparatus includes: a substrate; a plurality of light-emitting devices disposed over the substrate, wherein a selected one of the plurality of light-emitting devices is at least partially surrounded by the rest of the plurality of light-emitting devices, and wherein the selected one of the light emitting devices is hotter than the rest of the plurality of light emitting devices when the light emitting devices are in operation; and a feedback mechanism electrically coupled to the selected light-emitting device, the feedback mechanism being operable to: detect a change in a temperature of the selected light-emitting device; and adjust an electrical current through at least the selected light-emitting device in response to the detected change in the temperature.

In some embodiments, the plurality of light-emitting devices collectively occupy a predefined area of the substrate; and the selected light-emitting device is disposed near a center of the predefined area.

In some embodiments, at least a subset of the plurality of the light-emitting devices are electrically coupled in series, and wherein the selected one of the light-emitting devices is in the subset.

In some embodiments, the feedback mechanism is operable to adjust the electrical current through the plurality of light-emitting devices in response to the detected change in the temperature.

In some embodiments, the light-emitting devices each include a respective light-emitting diode (LED) die.

In some embodiments, the feedback mechanism is operable to: detect a rise in the temperature of the selected light-emitting device above a predetermined temperature threshold; and reduce the electrical current in response to the rise in the temperature.

In some embodiments, the feedback mechanism is operable to detect the change in the temperature by detecting a change in a voltage at a terminal of the light-emitting device In some embodiments, the feedback mechanism includes at least one of: a digital modulation device and one or more operational amplifiers (Op-Amps).

Another one of the broader forms of the present disclosure involves a photonic system. The photonic system includes: a substrate; a first set of light-emitting devices located on a first region of the substrate; a second set of light-emitting devices located on a second region of the substrate, wherein the first region of the substrate is at least partially encircled by the second region, and wherein the first set of light-emitting devices have higher temperatures than the second set of light-emitting devices when the first and second sets of light-emitting devices are both emitting light; and a thermal sensing structure electrically coupled to at least one of the first set of light-emitting devices, the thermal sensing structure being operable to: sense an increase in temperature of the light-emitting device coupled thereto; and thereafter decrease an electrical current of at least the light-emitting device coupled thereto.

In some embodiments, the first set of light-emitting devices includes a single centrally-located light-emitting device.

In some embodiments, the first region is encircled in 360 degrees by the second region.

In some embodiments, the thermal sensing structure is further operable to reinstate an original amount of electrical current for one or more of the light-emitting devices if the temperature of the one or more of the light-emitting devices falls below a temperature threshold.

In some embodiments, the first and second sets of light-emitting devices are coupled together in series.

In some embodiments, each light-emitting device in the first and second sets is a light-emitting diode (LED) chip.

In some embodiments, the thermal sensing structure is coupled to a voltage terminal of the light-emitting device and configured to sense a voltage at the voltage terminal.

In some embodiments, the thermal sensing structure is implemented using one of: one or more operational amplifiers (Op-Amps); and an analog-to-digital converter (ADC), a microcontroller, and a current driver.

One more of the broader forms of the present disclosure involves a method of thermally protecting an LED device. The method includes: providing a group of light-emitting diode (LED) dies on a substrate, the group of LED dies including a centrally-located LED die; detecting a temperature of the centrally-located LED die; and reducing an electrical current flowing through the centrally-located die if the detected temperature exceeds a predetermined threshold.

In some embodiments, the detecting and the reducing are each carried out using a feedback structure coupled to a voltage terminal of the centrally-located die.

In some embodiments, the predetermined temperature threshold is a first temperature threshold, and the method further includes: after the reducing, reinstating a former current level for one or more LED dies if the detected temperature falls within a second temperature threshold, wherein the second temperature threshold is substantially identical to the first temperature threshold or different from the first temperature threshold.

In some embodiments, the reducing the electrical current flow comprises one of: reducing the current flow for the centrally-located LED die; electrically bypassing the centrally-located LED die; and reducing the current flow for a subset of the group of LED dies, the subset including one or more LED dies in the group in addition to the centrally-located LED die.

DETAILED DESCRIPTION

It is understood that the following disclosure provides many different embodiments, or examples, for implementing different features of various embodiments. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Moreover, the terms "top," "bottom," "under," "over," and the like are used for convenience and are not meant to limit the scope of embodiments to any particular orientation. Various features may also be arbitrarily drawn in different scales for the sake of simplicity and clarity. In addition, the present disclosure may repeat reference numerals and/or letters in the various examples. This repetition is for the purpose of simplicity and clarity and does not in itself necessarily dictate a relationship between the various embodiments and/or configurations discussed. Moreover, although LED devices have been discussed herein, one of ordinary skill in the art would recognize that aspects of the present disclosure are applicable to other types of photonic devices as well.

Semiconductor devices can be used to make photonic devices, such as light-emitting diode (LED) devices. When turned on, LED devices may emit radiation such as different colors of light in a visible spectrum, as well as radiation with ultraviolet or infrared wavelengths. Compared to traditional light sources (e.g., incandescent light bulbs), LED devices offer advantages such as smaller size, lower energy consumption, longer lifetime, variety of available colors, and greater durability and reliability. These advantages, as well as advancements in LED fabrication technologies that have made LED devices cheaper and more robust, have added to the growing popularity of LED devices in recent years.

LED devices generate heat (or thermal energy) when they are in operation, i.e., emitting light. If the heat generated is not sufficiently or quickly dissipated, the LED devices may begin to overheat. LED devices that are overheated may suffer from poor light output performance, for example the color of the light may drift. In addition, LED devices may be damaged due to overheating. Thus, the durability and reliability performance of LED devices also depends on good thermal management.

To protect LED devices from overheating, LED thermal protection structures may be used. Traditional LED thermal protection structures may have generally acceptable performance when there is a single or a limited number of LED devices. However, as the number of LED devices begin to increase, traditional LED thermal protection structure may suffer from shortcomings such as inaccurate temperature detection and inability to provide timely cooling of overheated LED devices. Thus, traditional LED protection structures may perform poorly for multi-junction LED lighting modules using a plurality of LED dies or chips.

In according with various aspects of the present disclosure, different embodiments of an LED thermal protection structure are disclosed. The LED thermal protection structure disclosed herein substantially overcomes the drawbacks of conventional LED thermal protection structures, as discussed in more detail below.

Referring to FIG. 1, a simplified diagrammatic fragmentary top view of a multi-junction LED lighting module 50 is illustrated. The LED lighting module 50 includes a substrate 60. In some embodiments, the substrate 60 includes a printed circuit board (PCB) and may be thereafter referred to as a PCB 60. The PCB 60 may provide mechanisms for establishing electrical connections to electrical components located thereon. For example, the PCB 60 may include conductive traces operable to carry a voltage or current. The PCB 60 may be laminated with epoxy resin material having conductive lines formed therein. The PCB 60 may further include one or more embedded conductive plates to be incorporated in the conductive lines to enhance coupling integrity of the power and ground lines. Conductive plates are formed from metal, such as copper foil, and are patterned such that they are properly coupled to the power and ground lines.

The PCB 60 may also include a multi-layer structure. As an example, the PCB 60 may include a base layer, a conductive layer, an electrically insulator layer, and an ink layer. The base layer may act as a heat spreader to effectively dissipate thermal energy. The base layer may include metal and/or metal compounds. The conductive layer may contain embedded conductive traces for routing electrical signals. The electrically insulator layer may include a dielectric polymer or another electrically insulating material. The electrically insulator layer may include a material composition selected for its high thermal conductivity (e.g., greater than 1.0 W/mK). In other words, though the insulator layer impedes the flow of electrical current, it facilitates the flow of thermal energy. The ink layer is disposed on a surface of the conductive layer as an insulating cover for the conductive layer. The ink layer may include a solder mask ink. The ink layer may also be capable of reflecting light.

In one embodiment, the PCB 60 includes a metal core PCB (MCPCB). The MCPCB includes a metal base that may be made of Aluminum (or an alloy thereof). The MCPCB also includes a thermally conductive but electrically insulating dielectric layer disposed on the metal base. The MCPCB may also include a thin metal layer made of copper that is disposed on the dielectric layer. In alternative embodiments, the metal base, the dielectric layer, and the thin metal layer of the MCPCB may be made of other materials depending on design considerations and/or cost constraints. The MCPCB may provide a path for heat dissipation for devices formed thereon.

In one embodiment, the PCB 60 may be thermally coupled to a heat sink (not shown in FIG. 1). The heat sink may provide for dissipation of heat generated by the devices located on the PCB 60. In some embodiments, the heat sink includes aluminum. In another embodiment, the heat sink includes copper. An interface material may be applied between the PCB 60 and the heat sink. The interface material may include a thermally conductive material. In some embodiments, the interface material is a thermally conductive gel. The interface material may have adhesion properties such that it provides bonding between the PCB and the heat sink. Alternatively, the interface material may provide an interface for thermal conduction between the PCB and the heat sink.

Still referring to FIG. 1, the LED lighting module 50 includes a plurality of semiconductor photonic devices 81-89 that are mounted on the PCB 60. The semiconductor photonic devices 81-89 are LED dies (or LED chips) in the present embodiment, and as such may be referred to as LED dies 80-89 in the following paragraphs. The LED dies 81-89 each include two oppositely doped semiconductor layers. In one embodiment, the oppositely doped semiconductor layers each contain a "III-V" family (or group) compound. In more detail, a III-V family compound contains an element from a "III" family of the periodic table, and another element from a "V" family of the periodic table. For example, the III family elements may include Boron, Aluminum, Gallium, Indium, and Titanium, and the V family elements may include Nitrogen, Phosphorous, Arsenic, Antimony, and Bismuth. In the present embodiment, the oppositely doped semiconductor layers include a p-doped gallium nitride (GaN) material and an n-doped gallium nitride material, respectively. The p-type dopant may include Magnesium (Mg), and the n-type dopant may include Carbon (C) or Silicon (Si).

The LED dies 81-89 also each include a multiple-quantum well (MQW) layer that is disposed in between the oppositely doped layers. The MQW layer includes alternating (or periodic) layers of active material, such as gallium nitride and indium gallium nitride (InGaN). For example, the MQW layer may include a number of gallium nitride layers and a number of indium gallium nitride layers, wherein the gallium nitride layers and the indium gallium nitride layers are formed in an alternating or periodic manner. In one embodiment, the MQW layer includes ten layers of gallium nitride and ten layers of indium gallium nitride, where an indium gallium nitride layer is formed on a gallium nitride layer, and another gallium nitride layer is formed on the indium gallium nitride layer, and so on and so forth. The light emission efficiency depends on the number of layers of alternating layers and thicknesses.

The doped semiconductor layers and the MQW layer may all be formed by an epitaxial growth process known in the art. After the completion of the epitaxial growth process, a p-n junction (or a p-n diode) is created by the disposition of the MQW layer between the doped layers. When an electrical voltage (or electrical charge) is applied to the doped layers, electrical current flows through the LED dies 81-89, and the MQW layer emits radiation such as light in a visible spectrum. The color of the light emitted by the MQW layer corresponds to the wavelength of the light. The wavelength of the light (and hence the color of the light) may be tuned by varying the composition and structure of the materials that make up the MQW layer. The LED dies 81-89 may also include electrodes or contacts that allow the LED dies 81-89 to be electrically coupled to external devices.

In some embodiments, the LED dies 81-89 each have a phosphor layer coated thereon. The phosphor layer may include either phosphorescent materials and/or fluorescent materials. The phosphor layer may be coated on the surfaces of the LED dies 81-89 in a concentrated viscous fluid medium (e.g., liquid glue). As the viscous liquid sets or cures, the phosphor material becomes a part of the LED package. In practical LED applications, the phosphor layer may be used to transform the color of the light emitted by an LED dies 81-89. For example, the phosphor layer can transform a blue light emitted by an LED dies 81-89 into a different wavelength light. By changing the material composition of the phosphor layer, the desired light color emitted by the LED dies 81-89 may be achieved. It is also understood that each of the LED dies 81-89 may include optical mechanisms such as diffuser caps, lenses, or reflector structures.

The LED dies 81-89 each include a positive contact terminal (anode terminal) and a negative contact terminal (cathode terminal). A sufficient voltage needs to be applied across the positive and negative contact terminals for the LED dies 81-89 to emit light. In the embodiment shown in FIG. 1, the LED dies 81-89 are electrically coupled together in series. For example, the negative contact terminal of the LED die 81 is electrically coupled to a positive contact terminal of the LED die 82, and the negative contact terminal of the LED die 82 is electrically coupled to a positive contact terminal of the LED die 83, so on and so forth.

Since the LED dies 81-89 are coupled in series, they function as a light source collectively. Therefore, a voltage is applied across the LED dies 81-89 as a whole. In the illustrated embodiment, the positive contact terminal of the LED die 81 is electrically coupled to a contact pad 100 (located on the PCB 60), and the negative contact pad of the LED die 89 is electrically coupled to a contact pad 101 (located on the PCB 60). A voltage can be applied across the contact pads 100-101 to activate the LED dies 81-89 and cause them to emit light.

It is understood that the electrical configuration for the LED dies 81-89 illustrated in FIG. 1 is one of many different possible configurations. Different electrical configurations may be implemented in alternative embodiments. For example, the positive and negative contact terminals for the LED dies 81-89 may be flipped, such that the contact pad 100 is coupled to a negative contact terminal of the LED die 81, and the contact pad 101 is coupled to a positive contact terminal of the LED die 89. In addition, although the LED dies 81-89 are electrically coupled in series, they need not be coupled according to the numerical order from 81-89. For example, the LED die 84 may be coupled to the LED die 89, rather than to the LED die 85. In fact, any one of the LED dies 81-89 may be selected as the "endpoint" LED dies for the collective group of LED dies 81-89—that is, the voltage for the group of LED dies 81-89 may be applied through the anyone of the LED dies 81-89 chosen as the endpoint LED dies. Furthermore, the LED dies 81-89 may be electrically coupled in parallel (instead of in series) in a different embodiment. In that case, a respective voltage may need to be applied to the positive and negative contact terminals for each LED die individually.

In the illustrated embodiment, the LED dies 81-89 are spaced apart from adjacent dies, but they are otherwise congregated together to form a roughly rectangular pattern 110. The pattern 110 contains three horizontally-oriented rows and three vertically-oriented columns. The LED die 89 located in the middle row and the middle column is physically located in the middle of the group of LED dies 81-89. Hence, the LED die 89 may be referred to as a centrally-located LED die or a central LED die. As shown in FIG. 1, the LED die 89 is encircled (or surrounded) by the remaining or the rest of the LED dies 81-88. Though gaps remain between the encircling LED dies 81-88, it may be said that the central LED die 89 is encircled in 360 degrees by the LED dies 81-88.

The LED dies 81-89 generate heat or thermal energy while they are activated (i.e., emitting light). The thermal energy generated by each LED die tends to dissipate outwardly away from that LED die. The path (or paths) along which thermal energy dissipates may be referred to as a heat dissipation path. In the illustrated embodiment, since the central LED die 89 is encircled by the rest of the LED dies 81-88, the heat dissipation path of the LED die 89 is at least partially blocked by the LED dies 81-88. In other words, the thermal energy produced by the LED die 89 is somewhat "trapped" by the surrounding LED dies 81-88. Furthermore, some of the thermal energy dissipated by the LED dies 81-88 may also converge in an area at or near the LED die 89 due to its central location. For these reasons, the central LED die 89 will likely experience a greater temperature than the surrounding LED dies 81-88. In some cases, the central LED die 89 may become significantly hotter than the other LED dies 81-88. For example, the temperature difference between the LED die 89 and the other LED dies 81-88 may exceed 10 degrees Celsius.

The hotter operating temperature of the central LED die 89 may cause more wear and tear (or other types of damage) to the LED die 89 than to the other LED dies 81-88 over time. For example, phosphor efficiencies of LED devices are temperature dependent. Consequently, the central LED die 89 may malfunction or burn out before the other LED dies 81-88. In other words, the central disposition of the LED die 89 results in a hotter operating temperature, which may then degrade its performance and/or shorten its lifetime. These characteristics differentiate the LED die 89 from the other LED dies 81-88, which may have substantially lower operating temperatures.

However, the effect described above is not taken into account by traditional LED thermal protection structures, which generally monitor the temperature of a group of LED dies as a whole. Such approach is inadequate, because the overall temperature of a group of LED dies may be significantly lower than the hottest central LED die, and the high temperature conditions of the central LED die is not timely detected or addressed. Consequently, the hottest central LED die may burn out before the other LED dies. In situations where all the LED dies are electrically coupled in series, a single LED die failure may result in the failure of the entire group of LED dies even if the other LED dies are otherwise functional. Even in situations where the LED dies are electrically coupled in parallel—so that a single die failure does not necessarily lead to failure of the entire group of dies—it may be impractical or costly to replace the burnt out die. Thus, traditional LED thermal protection structures may be ineffective at protecting a group of LED dies.

To overcome the shortcomings of traditional LED thermal protection structures, the LED thermal protection structure 50 of the present disclosure actively monitors the temperature of the central (and hottest) LED die 89 and utilizes a feedback mechanism (or structure) to timely cool the LED die 89 when it becomes too hot. In more detail, as shown in FIG. 1, a contact pad 130 (located on the PCB 60) is electrically coupled to the positive contact terminal of the central LED die 89. Since the negative contact terminal of the LED die 89 is also electrically coupled out to the contact pad 101, a voltage potential across the LED die 89 may be measured. In other embodiments where the central LED die 89 is not an "endpoint" die, then an additional contact pad may be implemented, so that two separate contact pads may be used to provide electrical connections to both the positive and negative contact terminals of the central LED die. That way, a voltage potential may be measured at either terminal of the central LED die, or a voltage differential may be taken across the central LED die, so that a feedback mechanism can receive this electrical information and regulate the temperature of the central LED die correspondingly. As part of the temperature regulation, the current of the central LED die may be reduced in some embodiments. In some other embodiments, the temperature regulation may involve electrically bypassing the central LED entirely.

Figure 2:
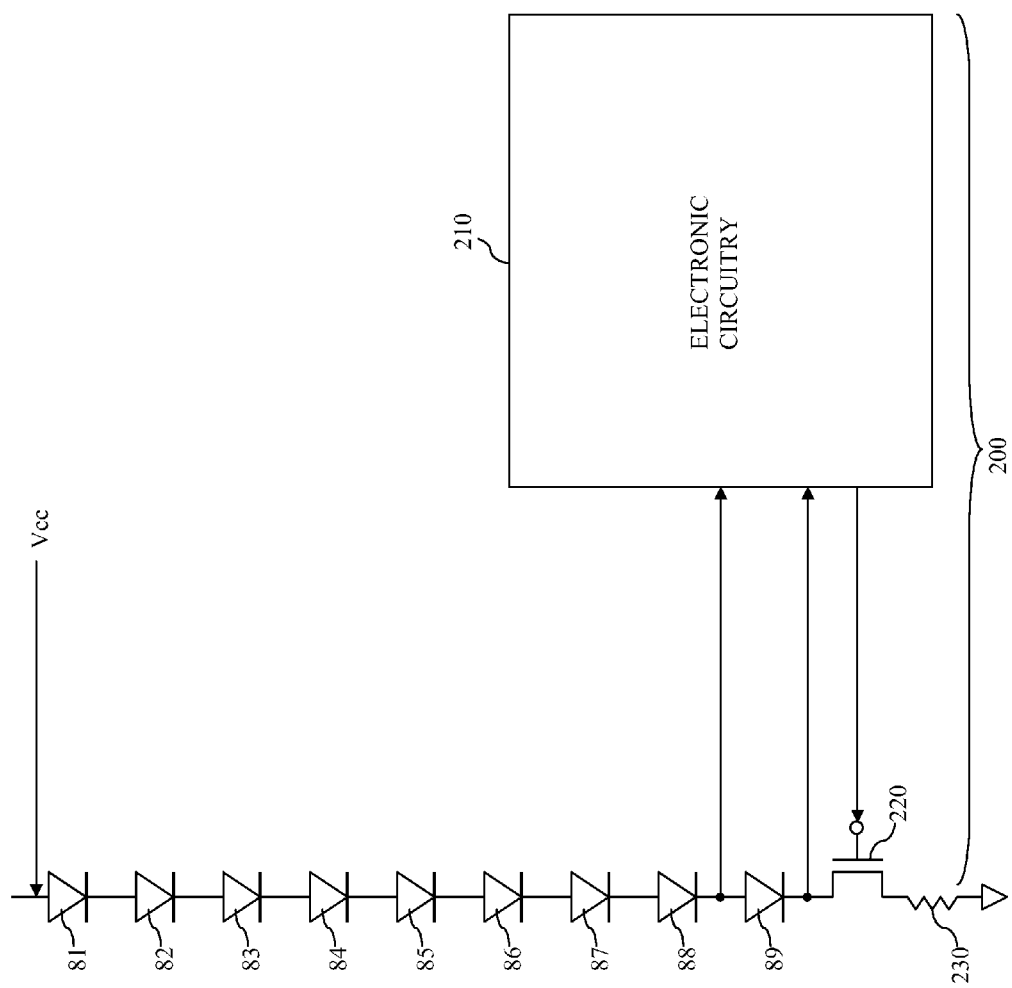
FIG. 2 is a simplified diagrammatic block diagram of the group of LED devices and a feedback structure used to monitor and cool the temperature of the LED devices according to various aspects of the present disclosure.

FIG. 2 illustrates a simplified block diagram of the plurality of LED dies 81-89 and a feedback structure 200 used to monitor and correct the temperature of the central LED die 89 according to some embodiments of the present disclosure. The LED dies 81-89 are electrically coupled together in series in the illustrated embodiment. A supply rail voltage Vcc is applied to the positive contact terminal of the LED die 81. As discussed above, the LED die 89 is located in the middle of the group of LED dies 81-89 and therefore may be the hottest LED die. The feedback structure 200 includes an electronic circuitry block 210 that receives the voltages measured at the positive and negative contact terminals of the central LED die 89 as inputs. The electronic circuitry block 210 contains a plurality of electronic components such as transistors, resistors, capacitors, inductors, etc. An example embodiment of the electronic circuitry block 210 is illustrated in FIG. 3 and will be discussed later in greater detail.

Still referring to FIG. 2, the electronic circuitry block 210 outputs a feedback signal to a gate of a transistor 220, which may also be considered as a component of the feedback structure 200. One source/drain terminal of the transistor 220 is coupled to the LED die 89. The other source/drain terminal of the transistor 220 is coupled to ground through a sensing resistor 230, which may be optional in some embodiments.

As the temperature of the LED die 89 rises, its resistance varies as well. In some embodiments, the LED die's resistance decreases as its temperature increases. The change in resistance causes the voltage of the LED die 89 to vary as well. Thus, it may be said that the temperature and the voltage of the LED die 89 are correlated with each other. The electronic circuitry block 210 detects the voltage of the LED die 89 and compares the detected voltage to a predetermined voltage that corresponds to an acceptable temperature threshold. When the detected voltage exceeds such threshold, it indicates that the LED die 89 has become overheated and needs to be cooled. In response to this condition, the electronic circuitry 210 generates the feedback signal to be sent to the transistor 220. The feedback signal may change the operation of the transistor 220 and cause it to draw less electrical current, thereby lowering the current flowing through the LED die 89 as well. With a reduced current flow, the temperature of the LED die 89 is also reduced. In this manner, the feedback structure 200 provides temperature detection for the central LED die 89 and cooling for the central LED die when it becomes overheated. It is understood that in some embodiments, an appropriate temperature threshold may involve a difference between the hottest LED die (e.g., central LED die) and cooler LED dies (e.g., LED dies surrounding the central LED die).

Figure 3:
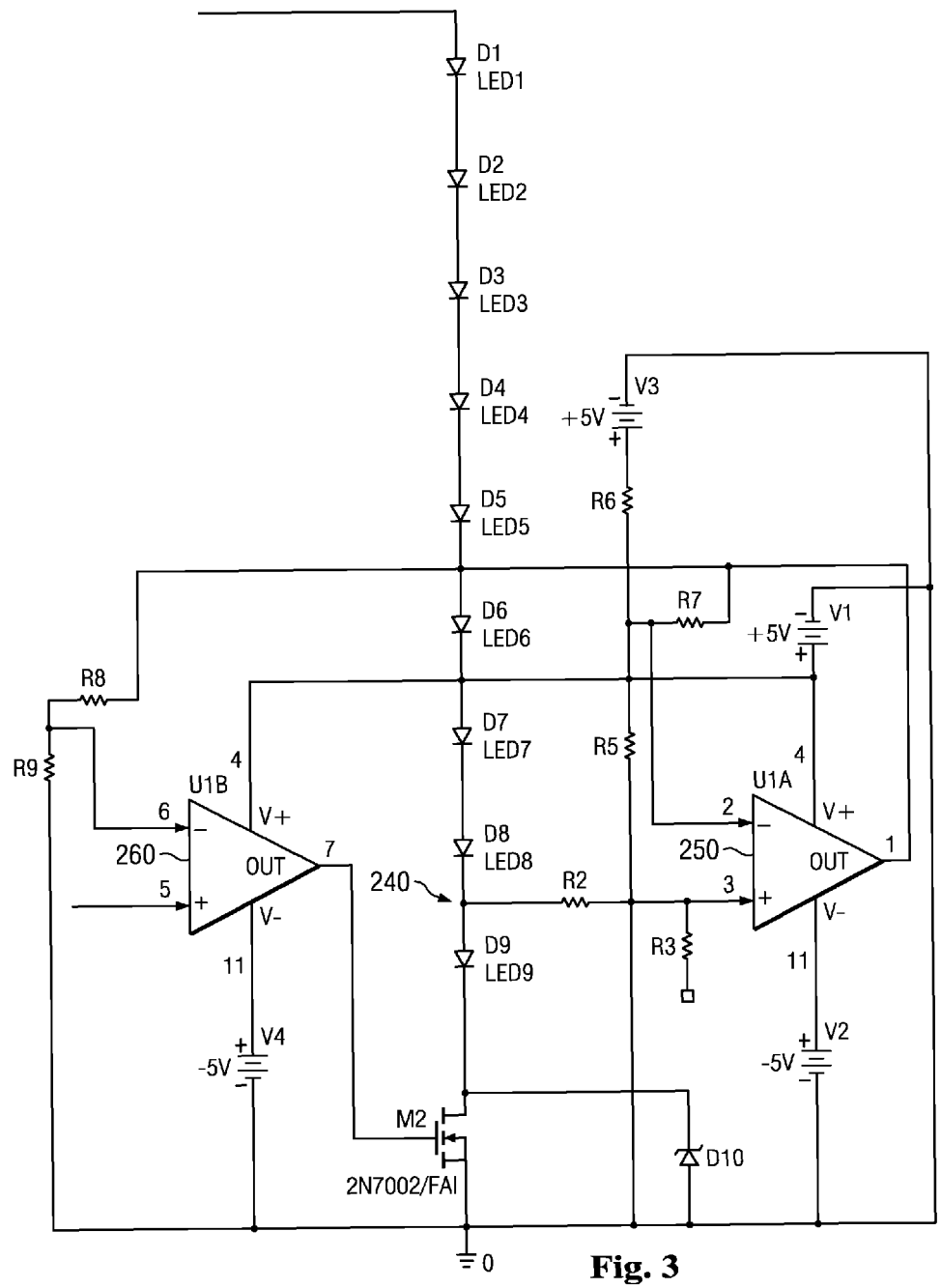
FIG. 3 is a simplified circuit schematic diagram of a portion of the feedback structure of FIG. 2 according to various aspects of the present disclosure.

FIG. 3 is an example circuit schematic illustrating a portion of the electronic circuitry block 210 of FIG. 2. As shown in FIG. 3, the LED devices D1-D9 represent the LED dies 81-89 of FIG. 2, respectively. The transistor M2 represents the transistor 220 of FIG. 2. The optional resistor 230 is not used in the embodiment shown in FIG. 3. The positive contact terminal—designated with circuit node 240—of the LED device D9 (i.e., central LED die 89) is electrically coupled to an operational amplifier 250 (Op-Amp), which may be implemented using a plurality of electronic circuit components such as transistors and resistors. Here, the Op-Amp 250 is in a non-inverting negative feedback configuration. In such configuration, the Op-Amp 250 "tracks" an input voltage from the LED device D9 at the node 240. In other words, an output voltage of the Op-Amp 250 is a function of the voltage at the node 240.

As temperature of the LED device D9 (i.e., central LED die 89) begins to rise, its resistance decreases, which leads to a drop in voltage at the node 240. Consequently, the voltage output of the Op-Amp 250 decreases as well. The voltage output of the Op-Amp 250 is fed to an input of another Op-Amp 260, which serves as a comparator herein. A predetermined reference voltage may also be applied to the Op-Amp 260. The reference voltage may correspond to a threshold temperature limit, since voltage and temperature may be correlated for an LED device as discussed above. A voltage above this reference voltage indicates an over temperature situation. The Op-Amp compares the voltage received from the Op-Amp 250 with the reference voltage. If the voltage received from the Op-Amp 250 is greater than the reference voltage, then the LED device D9 may still be deemed to be operating within a normal or tolerable temperature range. However, if the voltage received from the Op-Amp 250 is lower than the reference voltage, then that indicates the LED device D9 is overheated and needs to be cooled down.

In response to the voltage from the Op-Amp 250 being lower than the reference voltage, a voltage output of the Op-Amp 260 is reduced. The reduced voltage output from the Op-Amp 260 corresponds to a reduced voltage at the gate of the transistor M2. The current drawn by the transistor M2 is a function of the gate voltage, so a reduced gate voltage causes the transistor to draw less current, thereby decreasing an amount of electrical current flowing through the LED device D9. The reduced current flow helps cool down the temperature of the LED device D9. In this manner, the feedback loop (including the Op-Amps 250-260 and the transistor M2) can be used to actively monitor the temperature of the central LED die D9 and provide timely cooling of the LED die if it begins to overheat. In some embodiments, the current of the central LED die is reduced by the feedback loop. In other embodiments, the current for all the LED dies are reduced by the feedback loop. The current reduction may also involve electrically bypassing the central LED die or any other heated LED dies.

Figure 4:
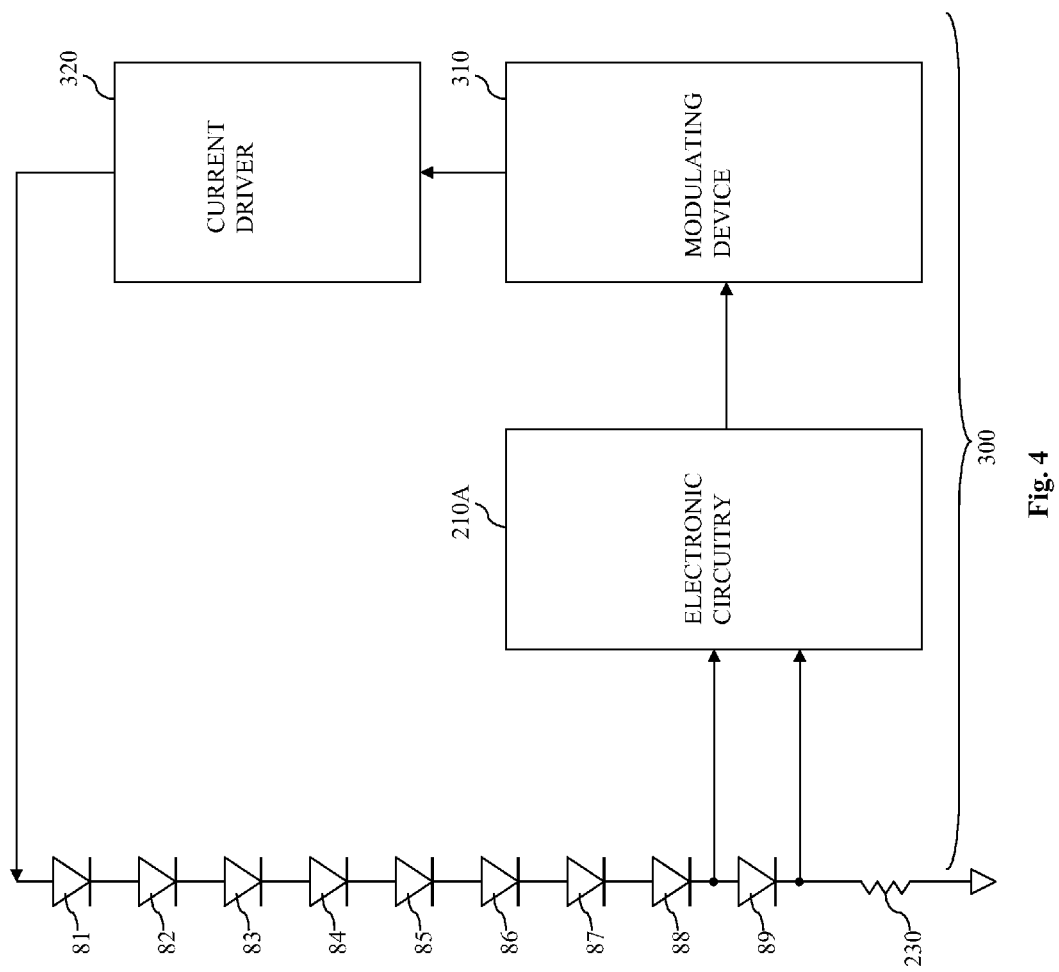
FIG. 4 is a simplified diagrammatic block diagram of the group of LED devices and another feedback structure used to monitor and cool the temperature of the LED devices according to various aspects of the present disclosure.

FIG. 4 illustrates a simplified block diagram of the plurality of LED dies 81-89 and a feedback structure 300 used to monitor and correct the temperature of the central LED die 89 according to another embodiment of the present disclosure. The feedback structure 300 shares certain similar components with the feedback structure 200 of FIG. 2, and for the sake of consistency and simplicity, these components are labeled the same in FIGS. 2 and 4. Referring to FIG. 4, the voltages of the LED die 89 are sent to an electronic circuitry block 210A, which may contain some of, or all of the circuitry components of the electronic circuitry block 210. For example, the electronic circuitry block 210A may contain an Op-Amp for detecting or tracking a voltage of the LED die 89.

The output of the electronic circuitry block 210A may be sent to a modulating device 310. The modulating device 310 may convert an analog signal to a digital signal equipped with a pulse-width modulation (PWM) technique. The modulating device 310 may include an analog-digital-convertor (ADC) and a micro-processor (MCU). As the temperature of the LED die 89 rises and its resistance and voltage decrease, the modulating device 310 may respond with a decreasing on-duty-cycle of Pulse Width Modulation (PWM). The PWM on-duty-cycle is the proportion of "on" time to the regular interval or "period" of time. A low on-duty-cycle represents a decreasing "on" time portion in a regular interval, and as such results in a lower average voltage output. Thus, the modulating device 310 produces a reduced voltage output in response to a temperature increase of the LED die 89.

The reduced voltage output of the modulating device 310 is sent to a current driver 320. The current driver 320 may include a transistor device and may produce a relatively constant amount of electrical current. The current driver 320 responds with a decreasing driving current and delivers the reduced driving current to the LED dies 81-89. With the driving current decreasing, the temperature of the LED die 89 may begin to drop. In this manner, the feedback structure 300 is used to actively monitor the temperature of the central LED die 89 and provide timely cooling of the LED die if it begins to overheat. In some embodiments, the temperature threshold that triggers the cooling process is the temperature of the hottest LED die. In other embodiments, the temperature threshold that triggers the cooling process is the temperature difference between the hottest LED die and one or more cooler LED dies. Also, in some embodiments, the cooling process involves reducing the electrical current flow in the hottest LED (e.g., central LED). In other embodiments, the cooling process may involve reducing the electrical current flow in a subset of LED dies or all of the LED dies, or electrically bypassing one or more of the LED dies. In addition, after one or more overheated LED dies have been sufficiently cooled off, the previous amount of the electrical current may be reinstated. For example, if the monitored temperature of the central LED die (or any other overheated LED die) has fallen below the predetermined temperature threshold (or another suitable predetermined temperature threshold), the current through the central LED die or all the LED dies are no longer reduced but reinstated to a level previously designed for normal operation. Once again, the predetermined temperature threshold may refer to either the absolute temperature of one or more specific LED dies, or a temperature difference between a selected number of LED dies.

The method and apparatus for providing thermal LED protection as discussed above may apply to any group of heat-producing LED dies. It is understood that different groups of LED dies may have positional configurations different from the one illustrated in FIG. 1. For the sake of providing more configuration examples, FIGS. 5 and 6 are provided and discussed below.

Figure 5:
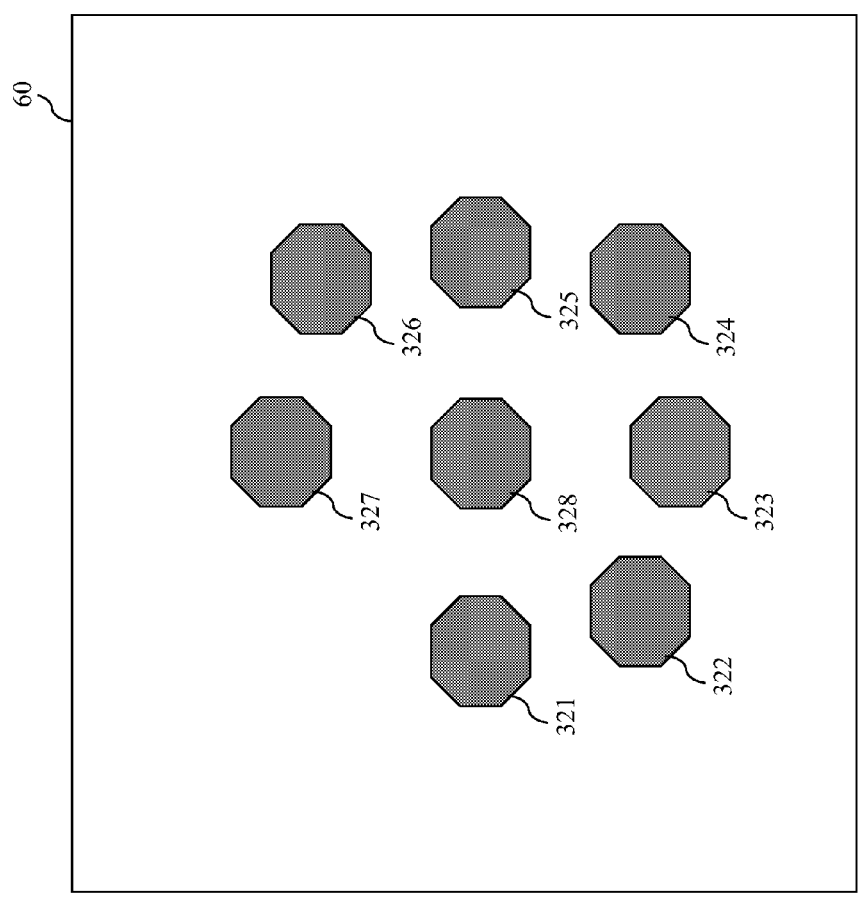
FIGS. 5-6 are simplified diagrammatic top views of groups of LED devices having alternative positional arrangements according to various aspects of the present disclosure.

Referring to FIG. 5, a simplified diagrammatic top view of a group of LED dies 321-328 is illustrated. The LED dies 321-328 are located on the substrate 60. No other components on the substrate 60 are illustrated for the sake of simplicity. As illustrated, the LED die 328 may be regarded as a central LED die, since it is loosely surrounded by the LED dies 321-327 (i.e., the heat dissipation path of the LED die 328 is partially blocked by the LED dies 321-327). Unlike the embodiment illustrated in FIG. 1, however, the LED dies 321-328 shown herein are not necessarily arranged in row/column format and may not have a rectangular collective profile. Furthermore, though the LED dies 321-327 loosely encircle the central LED die 328, they may not fully encircle the central LED die 328 in 360 degrees. For example, an upper left corner of the LED die 328 may be substantially "un-surrounded." In other words, the LED die 328 may be deemed a "central" die even if it is only partially encircled or surrounded by adjacent LED dies. This is because the LED die 328 may still gather the most thermal energy among all the LED dies 321-328, so that the LED die 328 is still the hottest LED die during its active operation.

Figure 6:
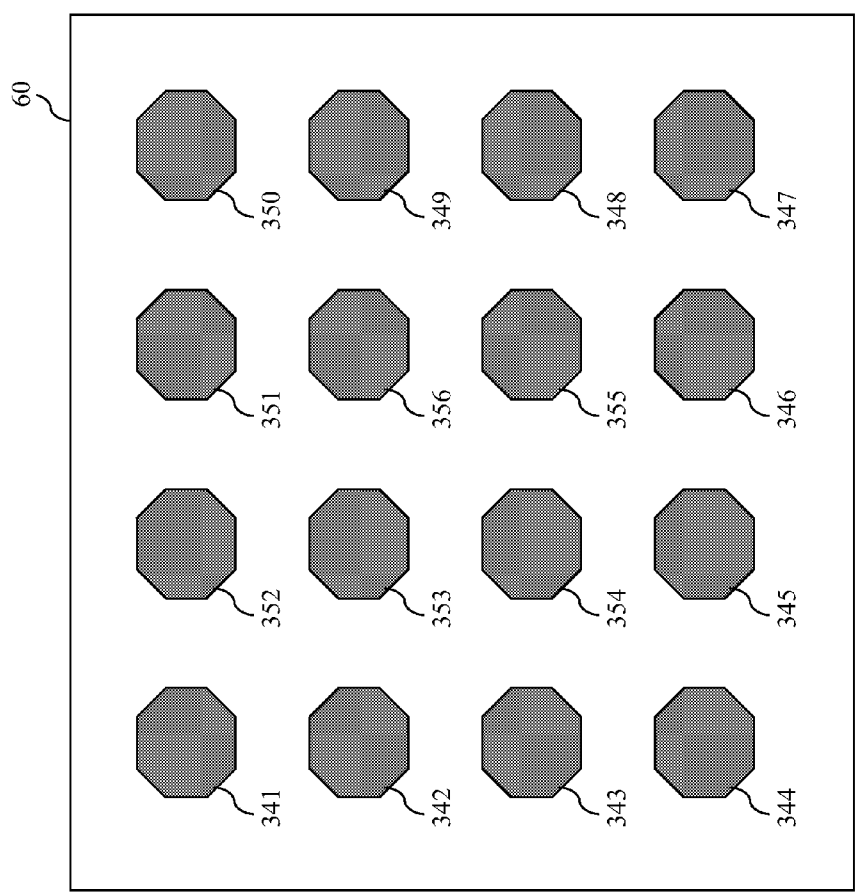

FIG. 6 illustrates a simplified diagrammatic top view of another group of LED dies 341-356 is illustrated. The LED dies 341-356 are located on the substrate 60. No other components on the substrate 60 are illustrated for the sake of simplicity. The LED dies 341-356 are arranged in a substantially rectangular format and have four rows and columns. However, there is no single "central" LED die. Rather, the LED dies 353-356 may be collectively considered as a central group or a central subset of LED dies, since they are collectively surrounded by the other subset of LED dies 341-350. Stated differently, among the group of LED dies 353-356, the heat dissipation path for each individual die is blocked by a similar surrounding structure. Thus, the temperatures of the LED dies 353-356 may be substantially similar to one another, and therefore the temperatures for all the LED dies in the central group may need to be monitored and timely cooled to prevent performance degradation and failure of the overall LED module.

Other alternative configurations of groups of LED dies may be implemented, but the inventive concepts of the present disclosure may also be used to provide thermal LED protection for these other configurations of LED devices. It is understood that the present disclosure offers advantages compared to traditional LED structures, it being understood that not all advantages are necessarily discussed herein, and different embodiments may offer additional advantages, and that no particular advantage is necessarily required for all embodiments.

One advantage is that the temperature monitoring herein is directed to the LED die(s) most likely to fail. That is, the LED die(s) that is located near a middle or central area among the group of LED dies is most likely to fail, since its thermal dissipation path is the most blocked. Instead of monitoring the temperature of the LED dies as a group, the present disclosure allows active monitoring of the temperature for the central LED die(s) and provides for timely cooling if the detected temperature is beyond an acceptable temperature threshold. In doing so, the light performance as well as the lifetime of the light module may be improved.

Another advantage is that the feedback mechanism disclosed herein is easy to implement, since it uses readily available electronic components such as transistors, resistors, etc. Furthermore, the implementation may be cost effective as well.

Figure 7:
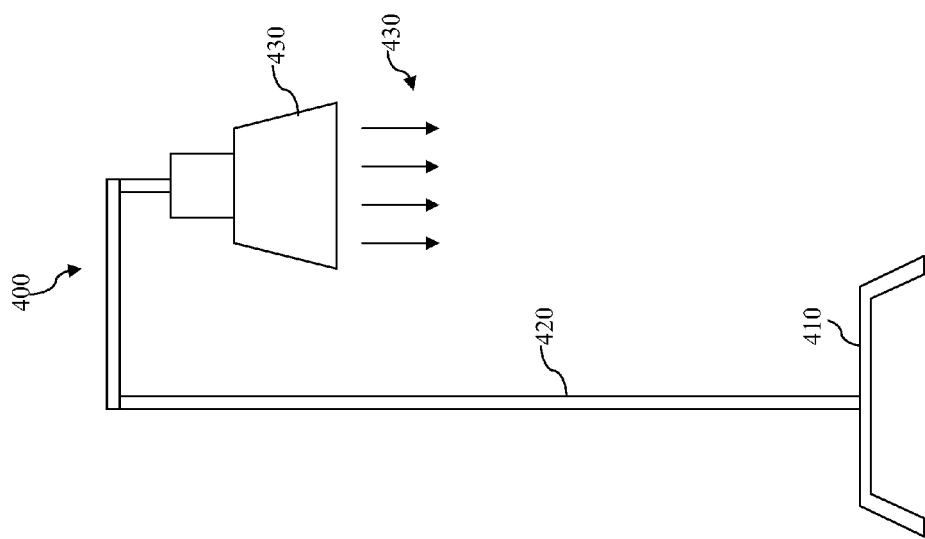
FIG. 7 is a diagrammatic view of a lighting module according to various aspects of the present disclosure.

FIG. 7 illustrates a simplified diagrammatic view of a lighting module 400 that includes some embodiments of the lighting module 50 discussed above. The lighting module 400 has a base or a stand 410, a body 420 attached to the base 410, and a lamp 430 attached to the body 420. In some embodiments, the lamp 430 is a down lamp (or a down light lighting module).

The lamp 430 includes the lighting module 50, which may contain a group of heat-producing LED dies as discussed above. Due at least in part to the advantages discussed above, the lamp 430 is operable to efficiently project light beams 440 that have superior light uniformity, and the lamp 430 may also enjoy a longer lifetime compared to traditional LED lamps.

Figure 8:
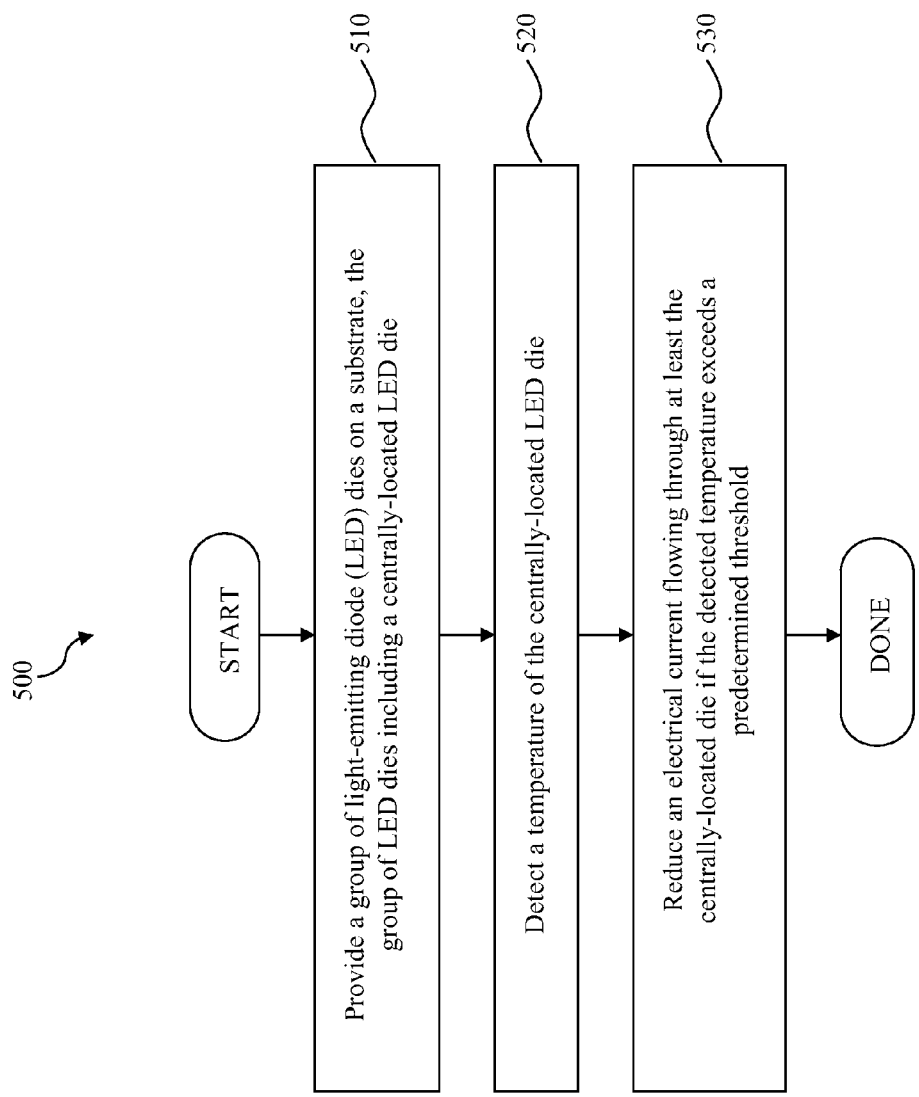
FIG. 8 is a flowchart illustrating a method of thermally protecting a group of LED devices according to various aspects of the present disclosure.

FIG. 8 is a flowchart of a method 500 for thermally protecting an LED module having a plurality of LED devices according to various aspects of the present disclosure. The method 500 includes a block 510, in which a substrate containing a group of light-emitting diode (LED) dies is provided. The group of LED dies including a centrally-located LED die. A heat dissipation path of the centrally-located die is at least partially blocked by the rest of the LED dies in the group. In some embodiments, the centrally-located die is encircled by the rest of the LED dies in the group. The method 500 includes a block 520, in which a temperature of the centrally-located LED die is detected. The method 500 includes a block 530, in which an electrical current flowing through the centrally-located die is reduced if the detected temperature exceeds a predetermined threshold. In some embodiments, the predetermined temperature threshold may refer to the absolute temperature of the centrally-located LED die. In other embodiments, the predetermined temperature threshold hold refers to a temperature difference between the centrally-located LED and one or more other LED dies, for example, one or the LED dies surrounding the central LED die or an LED die on the edge of the group of LED dies. The steps of the blocks 520 and 530 may both be performed at least in part by a feedback structure coupled to a voltage terminal of the centrally-located die. It is understood that additional steps may be performed before, during, or after the method 500. For example, after the centrally-located LED has been sufficiently cooled off (which may be indicated by the temperature of the centrally-located LED die falling below the temperature threshold), the previously designated amount of current may be reinstated for the centrally-located LED die or for the group of LED dies. For the sake of simplicity, other additional steps are not discussed herein.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus, comprising:
   a substrate;
   a plurality of light-emitting devices disposed over the substrate, wherein a selected one of the plurality of light-emitting devices is at least partially surrounded by the rest of the plurality of light-emitting devices, and wherein the selected one of the light emitting devices is hotter than the rest of the plurality of light emitting devices when the light emitting devices are in operation; and
   a feedback mechanism electrically coupled to the selected light-emitting device, the feedback mechanism being operable to:
      detect a change in a temperature of the selected light-emitting device; and
      adjust an electrical current through at least the selected light-emitting device in response to the detected change in the temperature.

2. The apparatus of claim 1, wherein:
   the plurality of light-emitting devices collectively occupy a predefined area of the substrate; and
   the selected light-emitting device is disposed near a center of the predefined area.

3. The apparatus of claim 1, wherein at least a subset of the plurality of the light-emitting devices are electrically coupled in series, and wherein the selected one of the light-emitting devices is in the subset.

4. The apparatus of claim 1, wherein the feedback mechanism is operable to adjust the electrical current through the plurality of light-emitting devices in response to the detected change in the temperature.

5. The apparatus of claim 1, wherein the light-emitting devices each include a respective light-emitting diode (LED) die.

6. The apparatus of claim 1, wherein the feedback mechanism is operable to:
   detect a rise in the temperature of the selected light-emitting device above a predetermined temperature threshold, wherein the predetermined temperature threshold includes one of: an absolute temperature, and a temperature difference; and
   reduce the electrical current in response to the rise in the temperature.

7. The apparatus of claim 1, wherein the feedback mechanism is operable to detect the change in the temperature by detecting a change in a voltage at a terminal of the light-emitting device.

8. The apparatus of claim 1, wherein the feedback mechanism includes at least one of: a digital modulation device and one or more operational amplifiers (Op-Amps).

9. A photonic system, comprising:
   a substrate;
   a first set of light-emitting devices located on a first region of the substrate;
   a second set of light-emitting devices located on a second region of the substrate, wherein the first region of the substrate is at least partially encircled by the second region, and wherein the first set of light-emitting devices have higher temperatures than the second set of light-emitting devices when the first and second sets of light-emitting devices are both emitting light; and
   a thermal sensing structure electrically coupled to at least one of the first set of light-emitting devices, the thermal sensing structure being operable to:
      sense an increase in temperature of the light-emitting device coupled thereto; and
      thereafter decrease an electrical current of at least the light-emitting device coupled thereto.

10. The photonic system of claim 9, wherein the first set of light-emitting devices includes a single centrally-located light-emitting device.

11. The photonic system of claim 9, wherein the first region is encircled in 360 degrees by the second region.

12. The photonic system of claim 9, wherein the thermal sensing structure is further operable to reinstate an original amount of electrical current for one or more of the light-emitting devices if the temperature of the one or more of the light-emitting devices falls below a temperature threshold.

13. The photonic system of claim 9, wherein the first and second sets of light-emitting devices are coupled together in series.

14. The photonic system of claim 9, wherein each light-emitting device in the first and second sets is a light-emitting diode (LED) chip.

15. The photonic system of claim 9, wherein the thermal sensing structure is coupled to a voltage terminal of the light-emitting device and configured to sense a voltage at the voltage terminal.

16. The photonic system of claim 9, wherein the thermal sensing structure is implemented using one of:
   one or more operational amplifiers (Op-Amps); and
   an analog-to-digital converter (ADC), a microcontroller, and a current driver.

17. A method, comprising:
   detecting a temperature of a centrally-located light-emitting diode (LED) die among group of LED dies on a substrate; and
   reducing an electrical current flowing through at least the centrally-located die if the detected temperature exceeds a predetermined threshold.

18. The method of claim 17, wherein the detecting and the reducing are each carried out using a feedback structure coupled to a voltage terminal of the centrally-located LED die.

19. The method of claim 17, wherein the predetermined temperature threshold is a first temperature threshold;
   and further comprising: after the reducing, reinstating a former current level for one or more LED dies if the detected temperature falls within a second temperature threshold, wherein the second temperature threshold is substantially identical to the first temperature threshold or different from the first temperature threshold.

20. The method of claim 17, wherein the reducing the electrical current flow comprises one of:
   reducing the current flow for the centrally-located LED die;
   electrically bypassing the centrally-located LED die; and
   reducing the current flow for a subset of the group of LED dies, the subset including one or more LED dies in the group in addition to the centrally-located LED die.

* * * * *